United States Patent
Norman

(10) Patent No.: US 12,338,929 B2
(45) Date of Patent: Jun. 24, 2025

(54) PUSH FITTING FOR METALLIC PIPE

(71) Applicant: Utility Supply Corporation, Kitchener (CA)

(72) Inventor: Jamie Norman, Mount Hope (CA)

(73) Assignee: UTILITY SUPPLY CORPORATION, Kitchener (CA)

( * ) Notice: Subject to any disclaimer, the term of this patent is extended or adjusted under 35 U.S.C. 154(b) by 43 days.

(21) Appl. No.: 17/989,073

(22) Filed: Nov. 17, 2022

(65) Prior Publication Data

US 2024/0167601 A1    May 23, 2024

(51) Int. Cl.
*F16L 37/092*    (2006.01)

(52) U.S. Cl.
CPC ................ *F16L 37/0925* (2013.01)

(58) Field of Classification Search
CPC .... F16L 37/0925; F16L 37/091; F16L 37/092
See application file for complete search history.

(56) References Cited

U.S. PATENT DOCUMENTS

| | | | | |
|---|---|---|---|---|
| 5,366,260 A | * | 11/1994 | Wartluft | F16L 37/0925 285/341 |
| 2004/0183302 A1 | * | 9/2004 | Allen | F16L 37/091 285/322 |
| 2008/0149873 A1 | * | 6/2008 | Cimberio | F16L 37/0925 251/149.6 |
| 2010/0176588 A1 | * | 7/2010 | Krausz | F16L 37/092 285/339 |
| 2011/0156383 A1 | * | 6/2011 | Bobst | F16L 37/091 285/24 |
| 2015/0137515 A1 | * | 5/2015 | Ratschmann | F16L 37/091 285/340 |
| 2022/0196195 A1 | * | 6/2022 | Norman | F16L 37/091 |

FOREIGN PATENT DOCUMENTS

| | | | | |
|---|---|---|---|---|
| CN | 108626504 A | * | 10/2018 | ............ F16L 37/091 |
| DE | 102008038480 A1 | * | 3/2010 | ............ F16L 37/091 |
| EP | 0083135 A1 | * | 7/1983 | ............ F16L 37/0925 |
| EP | 1840434 A2 | * | 10/2007 | ............ F16L 37/0925 |

(Continued)

OTHER PUBLICATIONS

English translation of WO2016064118A1 (Year: 2024).*

*Primary Examiner* — Matthew Troutman
*Assistant Examiner* — Fannie Kee

(57) ABSTRACT

A fitting for use with metallic pipe is disclosed. The fitting includes a body having a connection portion and an opening for receiving an end of the metallic pipe in an insertion direction along a longitudinal axis of the connection portion, a retainer positioned within the connection portion coaxial with the longitudinal axis, the retainer having a plurality of prongs extending radially towards the longitudinal axis, and a gripper positioned within the connection portion coaxial with the longitudinal axis between the retainer and the opening. The gripper is configured as a frusto-conical compression ring tapering towards the opening and has a plurality of gripping projections extending radially towards the longitudinal axis. In operation, the gripper and connection portion cooperate to increase compression on the metallic pipe if the metallic pipe is urged out of the fitting.

14 Claims, 5 Drawing Sheets

(56) References Cited

FOREIGN PATENT DOCUMENTS

| KR | 20060057240 A | * | 5/2006 | ......... F16L 37/0925 |
|---|---|---|---|---|
| NL | 2013426 A | * | 8/2016 | ......... F16L 37/0925 |
| NZ | 531121 A | * | 10/2004 | ............ F16L 37/091 |
| WO | WO-2012164773 A1 | * | 12/2012 | ............ F16L 37/091 |
| WO | WO-2015072379 A1 | * | 5/2015 | ......... F16L 37/0925 |
| WO | WO-2016064118 A1 | * | 4/2016 | .............. F16L 15/00 |
| WO | WO-2020019732 A1 | * | 1/2020 | ......... F16L 37/0925 |

* cited by examiner

PUSH FITTING FOR METALLIC PIPE

FIELD

This application relates generally to push fittings for metallic pipe.

BACKGROUND

Various configurations for connecting metallic pipe, such as copper pipe, to plumbing fittings are known, including soldering, threaded connections and push fitting configurations. Push fittings may be preferable to other methods of connecting metallic pipe due to the expected ease and simplicity of using a push fitting in which only a force is required to push the metallic pipe into the fitting. However, current configurations of push fittings may provide insufficient retention force to keep the metallic pipe in place, leading to leakage when the pipe is pressurized or when other pullout forces are exerted on the pipe.

It may be desirable to provide improved push fittings for metallic pipe, such as copper pipe.

SUMMARY

According to one aspect of the present disclosure, there is provided a fitting for use with metallic pipe, the fitting comprising: a body having a connection portion and an opening for receiving an end of the metallic pipe in an insertion direction along a longitudinal axis of the connection portion; a retainer positioned within the connection portion coaxial with the longitudinal axis, the retainer having a plurality of prongs extending radially towards the longitudinal axis; and a gripper positioned within the connection portion coaxial with the longitudinal axis between the retainer and the opening, the gripper being configured as a frusto-conical compression ring tapering towards the opening and having a plurality of gripping projections extending radially towards the longitudinal axis, wherein, in operation, the gripper and connection portion cooperate to increase compression on the metallic pipe if the metallic pipe is urged out of the fitting.

Other aspects of the present disclosure are possible.

BRIEF DESCRIPTION OF THE DRAWINGS

The foregoing summary, as well as the following detailed description of illustrative embodiments of the present application, will be better understood when read in conjunction with the appended drawings. For the purposes of illustrating the present application, there is shown in the drawings illustrative embodiments of the disclosure. It should be understood, however, that the application is not limited to the precise arrangements and instrumentalities shown. In the drawings.

DETAILED DESCRIPTION

The present disclosure relates to embodiments for push fittings for metallic pipe. Metallic pipe, particularly copper pipe, is common in plumbing and municipal applications. Traditionally, copper and metallic pipe have been soldered or threaded to fittings, both of which require additional labour as compared to a push fittings in which the pipe is inserted into the fitting with sufficient force and thereafter held in place.

Known push fittings for metallic pipe typically contain a rudimentary retainer ring and/or silicone or rubber gasket. The retainer ring often lacks the sufficient retention means to securely keep the metallic pipe in place in every instance, resulting in leakage when the pipe is pressurized. For example, some known retainer rings only include a single biting edge to bite into the outer surface of the pipe.

Moreover, metallic pipe, particularly copper pipe, typically has an oval shape, rather than a precise circular shape, at the end being inserted into the fitting due to how the pipe is manipulated and prepared for use. Known pushing fittings do not specifically accommodate the oval shape and are instead configured for a circular end to the metallic pipe. This has lead to uneven retention forces or gripping forces on the pipe end in known push fittings, further reducing the retention capability of known push fittings.

Additionally, typical and existing service line valves and fittings used for municipal applications all utilize a common "compression nut assembly". In such an assembly, the gripper is an overlapping stainless steel cutter embedded in a rubber gasket for hydrostatic seal. This common compression design is intended for both copper and plastic pipes and the retention potential from pull out is determined by closely tolerancing the nut assembly to the adjacent body. An undesirable consequence of this assembly is that even a slight difference in machining tolerances can cause insufficient pull out resistance.

Figure 1:
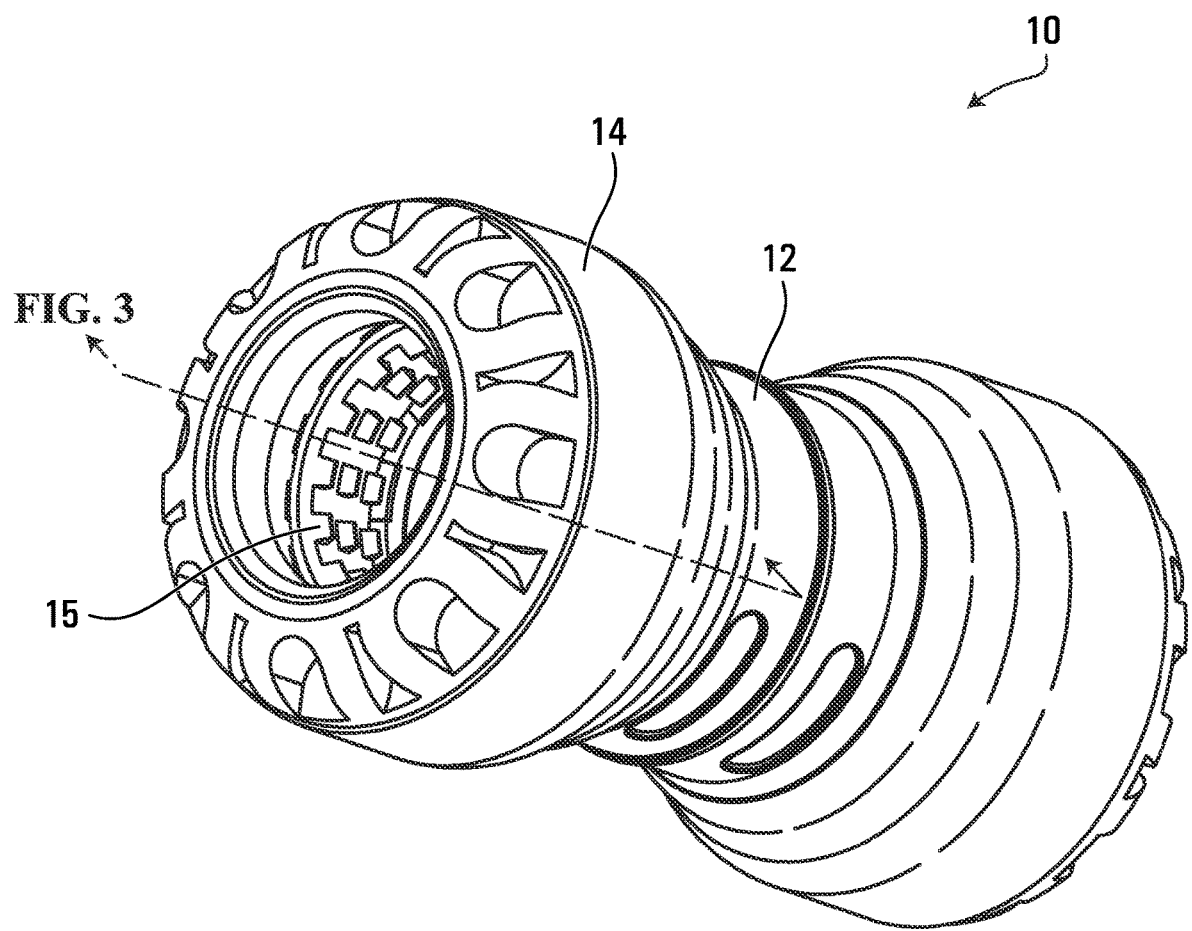
FIG. 1 shows a push fitting according to an embodiment of the present disclosure.
Figure 2:
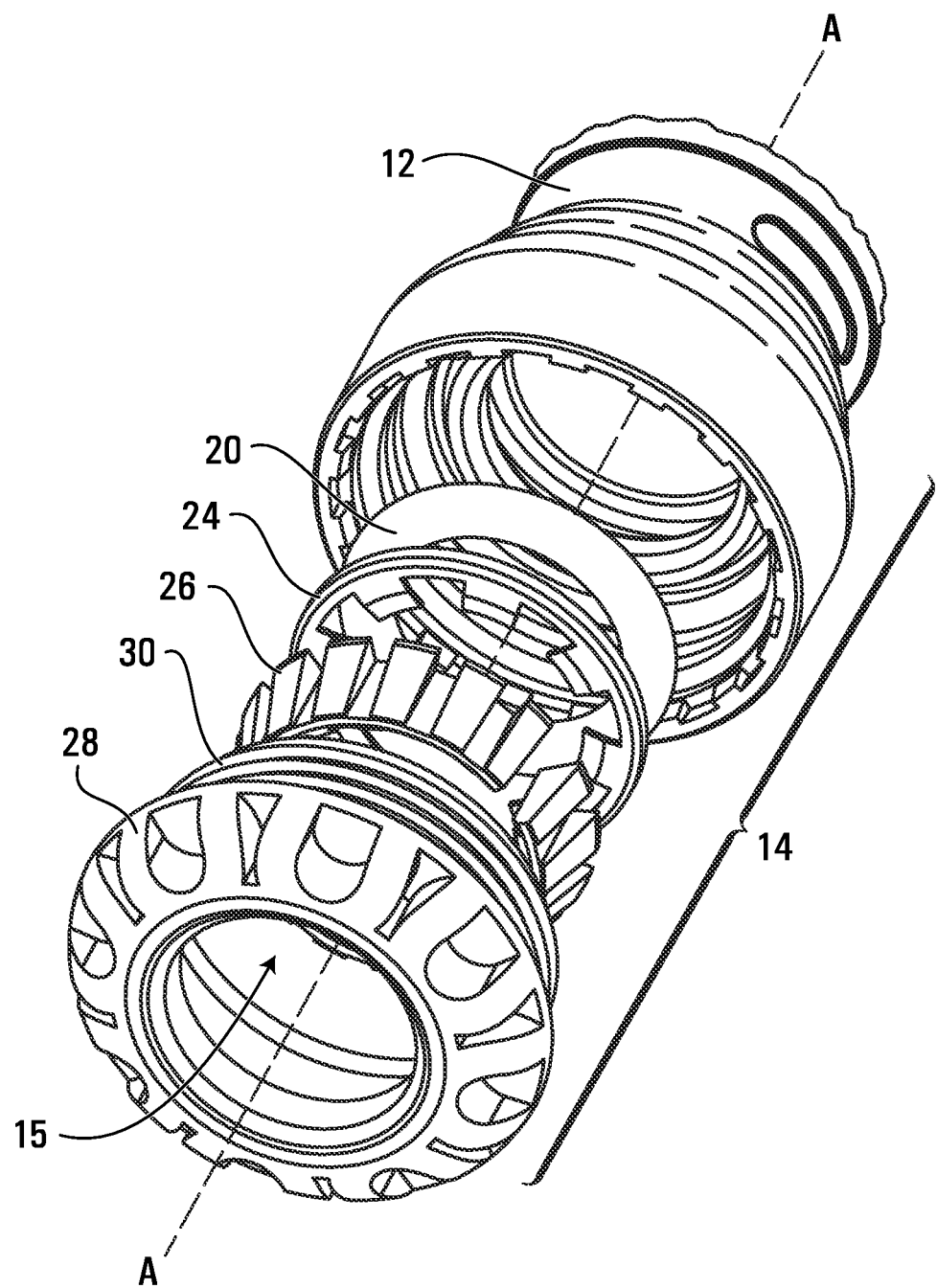
FIG. 2 shows an exploded view of the fitting of FIG. 1.
Figure 3:
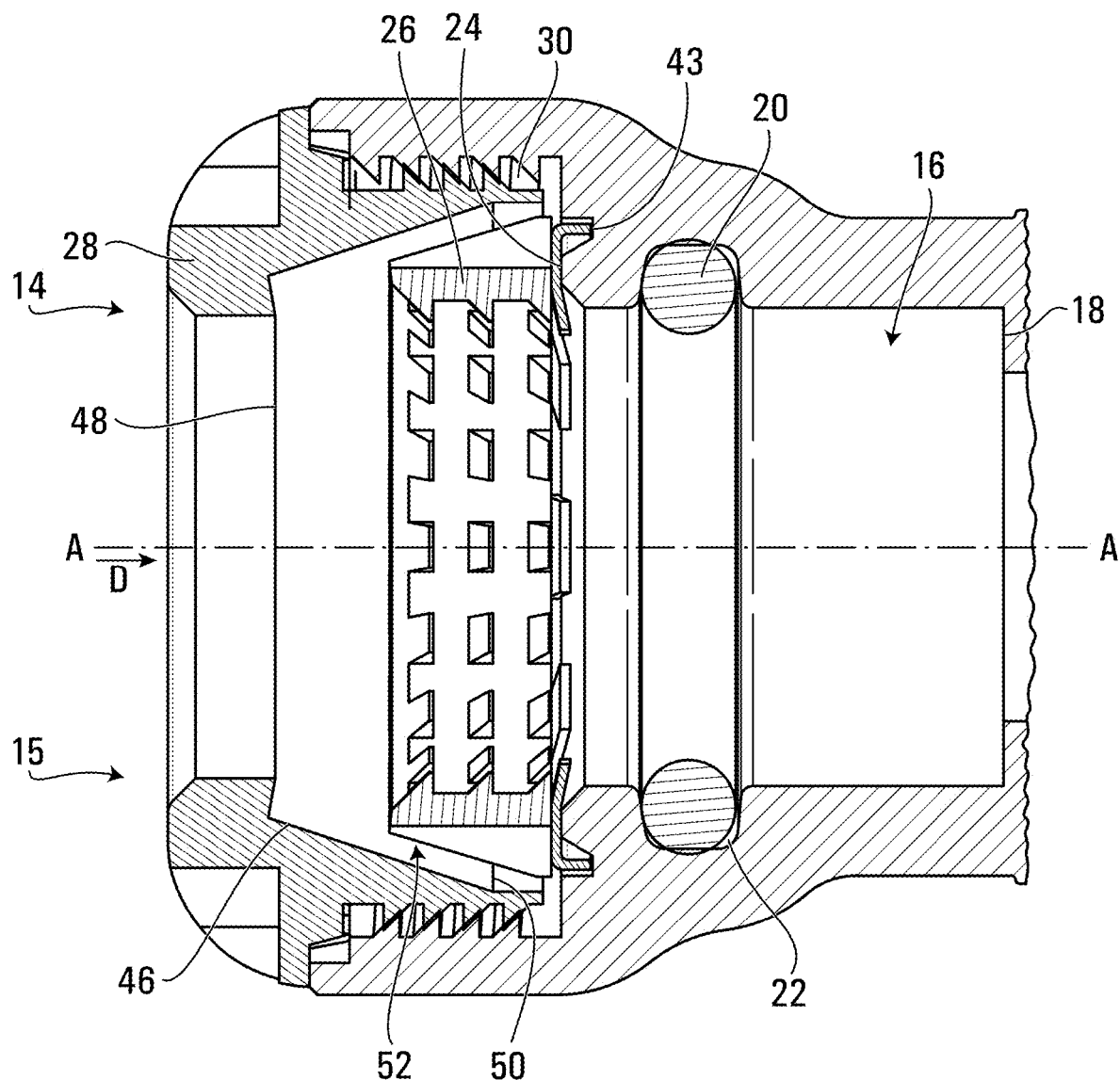
FIG. 3 shows a partial cross-sectional view taking alone line 3-3 in FIG. 1.

FIGS. 1 to 3 show one example embodiment of a push fitting 10 according to the present disclosure. While the illustrated embodiment is a double-sided coupling allowing for pipe to be connected on either end and coupled together, the principles and embodiments of the present disclosure are also applicable to and can be incorporated into other types of plumbing and underground fittings, including commercial plumbing and underground service line valves and fittings, such as corporation stops, ball valves, meter valves, couplings, and adaptors and the like.

A fitting according to the present disclosure, such as the fitting 10, includes a body 12, having a connection portion 14 for receiving an end of the metallic pipe (not shown) to be inserted through an opening 15 into an internal cavity 16 of the connection portion 14. A longitudinal axis A extends through the connection portion 14 and is generally co-axial with the longitudinal axis of the metallic pipe to be inserted. The opening 15 is generally circular and concentric about the axis A. The opening 15 has a diameter matching or wider than the pipe to be inserted. The metallic pipe is therefore inserted in a direction D generally along the axis A.

The metallic pipe may be inserted into the connection portion 14 until the end of the pipe reaches and abuts against internal ledge 18 of the connection portion 14.

As shown in the illustrated embodiment, an internal O-ring 20, positioned within groove 22 and partially extending into the internal cavity 16, may be present to seal again the metallic pipe following insertion thereof.

A retainer 24 is positioned within the connection portion 14. In the embodiment shown, the retainer 24 is positioned within a retainer groove 43 that is coaxial with the axis A.

A gripper 26 is positioned within the connection portion 14 coaxially with the axis A. The gripper 26 is positioned axially between the retainer 24 and the opening 15.

In the illustrated embodiment, a nut 28, which defines the opening 15 and part of the internal cavity 16, is threaded via thread 30 onto the body 12 to form the internal cavity 16 with an internal portion of the body 12. In the illustrated embodiment, the nut 28 permits assembly of the fitting 10 by allowing the retainer 24, gripper 26 and O-ring 20 to be positioned within the body 12 before closure with the nut 28.

Figure 4:
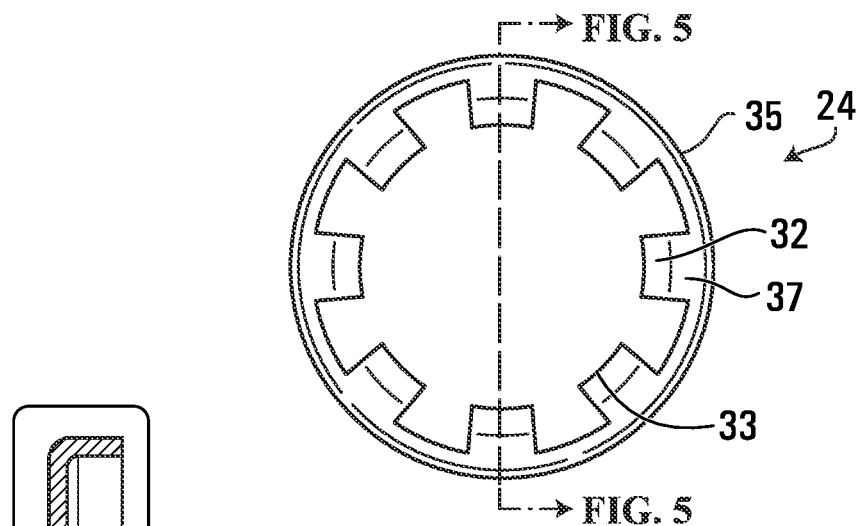
FIG. 4 is a plan view of a retainer according to an embodiment of the present disclosure.
Figure 5:
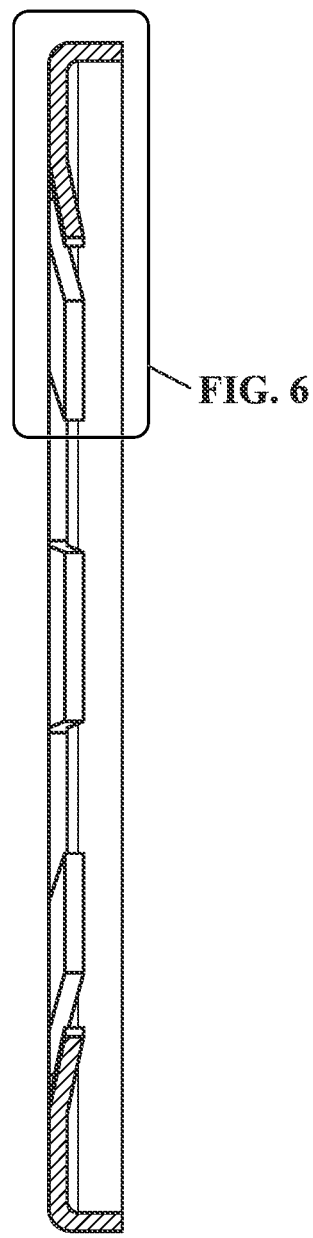
FIG. 5 is a cross-sectional view taken along line 5-5 in FIG. 4.
Figure 6:
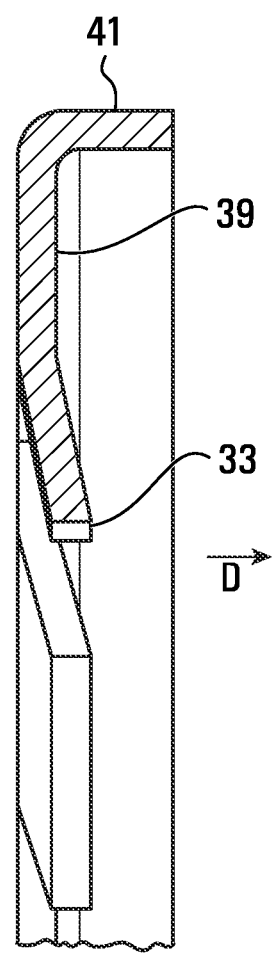
FIG. 6 is an enlarged fragmentary view of the portion identified in FIG. 5.
Figure 7:
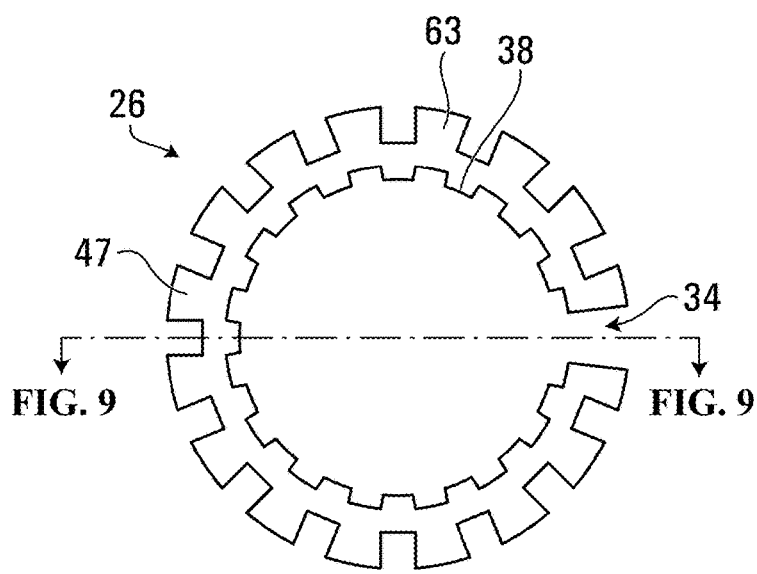
FIG. 7 is a plan view of a gripper according to an embodiment of the present disclosure.
Figure 8:
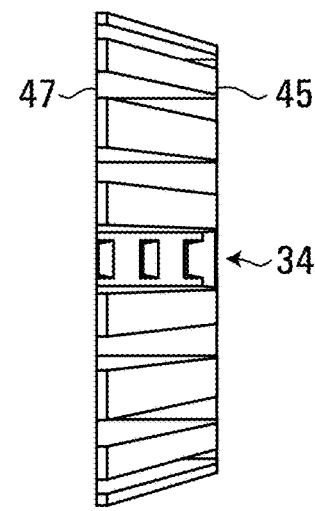
FIG. 8 is a side view of the gripper of FIG. 7.
Figure 9:
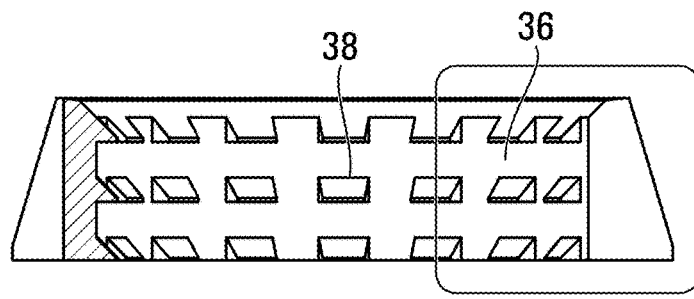
FIG. 9 is a cross-sectional view taken along line 9-9 in FIG. 7.
Figure 10:
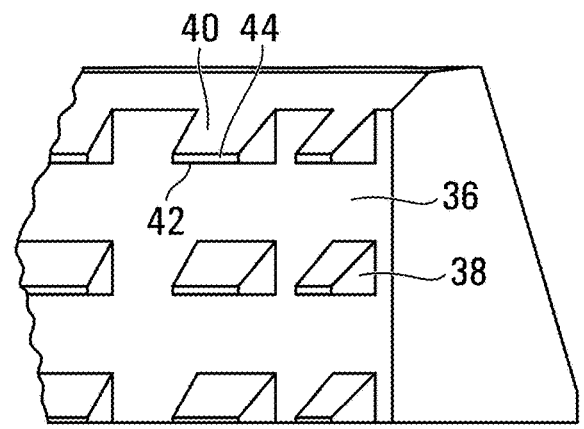
FIG. 10 is an enlarged fragmentary view of the portion identified in FIG. 9

Referring to FIG. 4, in one embodiment the retainer 24 is configured as a ring having a plurality of prongs 32 extending radially inward toward axis A. In the illustrated embodiment, the prongs 32 are configured as tabs or blades, shaped generally rectangularly in plan view and arranged around the circumference of the retainer 24. The prongs 32 are spaced from each other at substantially equal intervals in the circumferential direction and angled toward the insertion direction D. In the illustrated embodiment, the prongs 32 are angled at approximately 12 degrees. But other angles are possible and within the scope of the present disclosure.

Each prong ends at a radially distal edge 33. The distance between opposing edges 33 is less than the outer diameter of the pipe to be inserted, resulting in contact between the edges 33 and the pipe upon insertion.

A permitter 35 of the retainer 24 connects the prongs 32 and provides a first face 37, which faces the opening 15 when the retainer is positioned within the connection portion 14. Opposite the first face 37, the retainer 24 includes a second face 39 extending between the prongs 32. A lip 41 extends along the circumference of the retainer 24 and extends from the second face 39. The lip 41 is received within groove 43 of the body 12 and aids in maintaining positioning of the retainer 24.

Other embodiments of the retainer are possible and within the scope of the present disclosure. For example, the retainer may have another shape, thickness, size, and/or configuration than in the illustrated embodiment. The retainer may be a partial ring. The retainer may be cylindrical or frusto-conical. The shape, sizing, position, number, spacing and arrangement of the prongs may be different than in the illustrated embodiment. The prongs may taper in a radial direction, having a trapezoid shape, or have parallel edges in the radial direction. The prongs may comprise two or more sets of prongs, each set varying in shape, size, angle, and/or configuration. The prongs may extend more or less radially into the internal cavity to interact with the outer surface of the pipe. By modifying the shape, size, angling, and/or radial extent of the prongs and/or the configuration of the retainer generally, one can control the amount of interference between the retainer and the metallic pipe.

The retainer may be made of any suitable material, typically a metal. The retainer and gripper may be made of different materials, depending on the intended application.

The gripper 26 is configured as a frusto-conical compression ring having a gap 34 along its circumference to allow for compression of the gripper and a reduction in the space enclosed by the gripper 26. To provide structural stability while also permitting sufficient flexibility to permit compression, the outer surface of the gripper 26 is formed by ribs 63 extending parallel to the axis of the ring and spaced along the circumference of the gripper 26 at substantially equal intervals. The gripper 26 is positioned such that it tapers towards the opening 15, having a first end 45 with a smaller diameter than a second end 47.

On an internal surface 36 of the gripper 26, the gripper 26 includes a plurality of gripping projections 38. In the illustrated embodiment, the gripping protections 38 are configured as teeth-like projections 38 arranged in three rings spaced axially from each other. The projections 38 are spaced approximately equally from each other in a circumferential direction along the internal surface 36.

Each individual projection 38 is configured as a triangular prism have a slanted side 40 that extends at a non-right angle from the internal surface 36 and meets a bottom side 42 that extends orthogonally from the internal surface 36. The slanted side 40 and bottom side 42 meet at a forward edge 44 of each projection 38. The bottom side 42 faces away from the opening 15 such that the forward edge 44 may engage an outer surface of the metallic pipe. In particular, the distance between edges 44 of diametrically opposing projections 38 is less than the outer diameter of the pipe being inserted.

Other embodiments of the gripper are possible and within the scope of the present disclosure. The gap in the gripper may be larger or smaller than in the illustrated embodiment. The tapering angle may be greater or lesser. The gripper may have a smooth exterior. The shape, size, spacing and/or arrangement of the ribs on the exterior of the gripper may vary. The thickness of the gripper may differ. The size, shaping, spacing, number, arrangement and/or configuration of the projections on the interior may be different than in the illustrated embodiment. The projections may be formed as one or more continuous, axially arranged rings having interior edges. The angling of the slanted and opposing sides of the projections may differ from the illustrated embodiment. There may be a plurality of sets of projections, each set differing in shape, sizing, and/or configuration. There may be only a single ring of projections. In embodiments with multiple rings, the projections may differ between rings. For example, projections at the tapered end of the gripper may be configured to extend more or less into the metallic pipe than projections at the wider end of the gripper. By modifying the size, shape, spacing, radial extension, arrangement and/or configuration of the projections and/or the configuration of the gripper more generally, one can control the amount of interference between the gripper and the metallic pipe.

The gripper may be made of any suitable material, typically a metal. The retainer and gripper may be made of different materials, depending on the intended application.

The connection portion 14 includes, on an interior, a conical or frusto-conical surface 46 coaxially arranged around axis A and tapering towards opening 15. The tapering of surface 46 may be complementary to the tapering of the gripper 26 such that the angle of taper of both the surface 46 and the gripper 26 are substantially alike. The surface 46 surrounds the gripper 26 but has larger diameters at respective first and second ends 48 and 50 compared to the diameters at the first and second ends 45 and 47 of the gripper 26. Thus, there exists a gap or clearance 52 between the surface 46 and the gripper 26 that permits the gripper to move both axially and radially within the portion of the internal cavity 16 formed by the surface 46. However, the clearance 52 is not so great as to allow for the opening at the first end 45 of the gripper 26 to be misaligned with the opening 15 so as to prevent successful insertion of the metallic pipe until contact with the ledge 18.

In operation, the metallic pipe is inserted into the opening 15 until contact with the ledge 18. The slanting of the slanted sides 40 of the projections 38 and angling of the prongs 32 in the insertion direction D aid in allowing the pipe to be inserted. After insertion, contact between the edges 33 with the pipe and contact between the edges 44 and the pipe resist removal of the pipe in the direction opposite the direction D and aid in retaining the pipe. The clearance 52 and/or the gap 34 permits the gripper 26 to accommodate the pipe that may have an outer shape that is not perfectly circular but somewhat oval.

Upon an attempt to withdraw the pipe from the fitting, for example when the pipe is pressurized and the pressure of water flow causes the pipe to be urged out of the fitting, movement of the gripper 26 towards the opening 15 causes the gripper 26 to contact surface 46. Tapering of the surface 46 causes the gripper 26 to compress around the pipe, the compression increasing as the gripper 26 is urged towards the opening 15. As the gripper 26 is compressed, the projections 38—and thus edges 44—are urged into the metallic pipe, tightening the grip on the pipe.

More generally, in operation, the gripper and connection portion cooperate to increase compression on the metallic pipe if the metallic pipe is urged out of the fitting. In other embodiments, this may be achieved with other means than in the illustrated embodiment. For example, there may be projections extending from one or both of the outer surface of the gripper and internal surface of the cavity to interact with the other to aid in increasing compression.

The retainer 24 may aid in "priming" or otherwise causing the gripper 26 to be urged towards the opening 15. In particular, the prongs 32 extend and contact the pipe, interfering with the pipe's outer surface. As the pipe is urged out of the fitting, it acts on the prongs 32 and, in turn, the retainer 24, which is also towards the opening 15. The retainer 24 axially abuts and urges the gripper 26 towards the opening 15 as well. For example, the first face 37 of the retainer 24 abuts and contacts the second end 47 of the gripper 26. In this manner, the retainer 24 and gripper 26 may cooperate to aid in retention of the pipe beyond the retention ability of either the retainer 24 or gripper 26 alone.

Numerous specific details have been set forth in order to provide a more thorough understanding of the inventive concepts. However, it will be apparent to one of ordinary skill in the art that the inventive concepts within the instant disclosure may be practiced without these specific details. In other instances, well-known features have not been described in detail to avoid unnecessarily complicating the instant disclosure.

As used herein, the terms "comprises," "comprising," "includes," "including," "has," "having" or any other variation thereof, are intended to cover a nonexclusive inclusion. For example, a composition, a process, method, article, or apparatus that comprises a list of elements is not necessarily limited to only those elements but may include other elements not expressly listed or inherently present therein.

As used herein the terms "generally", "approximately," "about," "substantially" and variations thereof are intended to include not only the exact value qualified by the term, but to also include some slight deviations therefrom, such as deviations caused by measuring error, manufacturing tolerances, wear and tear on components or structures, stress exerted on structures, and combinations thereof, for example.

Use of the "a" or "an" are employed to describe elements and components of the embodiments herein. This is done merely for convenience and to give a general sense of the inventive concepts. This description should be read to include one or at least one and the singular also includes the plural unless it is obvious that it is meant otherwise.

Any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Moreover, it will be understood that features of one embodiment may be combined with features of other embodiments, even if not expressly recited or described as a combination.

The invention claimed is:

1. A fitting for use with metallic pipe, the fitting comprising:
   a body having a connection portion and an opening for receiving an end of the metallic pipe in an insertion direction along a longitudinal axis of the connection portion;
   a retainer positioned within the connection portion coaxial with the longitudinal axis, the retainer having a plurality of prongs extending radially towards the longitudinal axis, wherein the plurality of prongs are angled away from the opening; and
   a gripper positioned within the connection portion coaxial with the longitudinal axis between the retainer and the opening, the gripper being configured as a frusto-conical compression ring tapering towards the opening and having a plurality of gripping projections extending radially towards the longitudinal axis,
   wherein the plurality of gripping projections are arranged on an inner surface of the gripper and spaced from each other in a circumferential direction, wherein an outer surface of the gripper comprises a plurality of ribs extending parallel to the longitudinal axis and spaced from each other in the circumferential direction at substantially equal intervals with gaps between adjacent ribs, wherein each gripping projection on the inner surface is aligned with one of the gaps between the ribs,
   wherein, in operation, the gripper and connection portion cooperate to increase compression on the metallic pipe if the metallic pipe is urged out of the fitting; and
   wherein, when the metallic pipe is received within the connection portion, the fitting only engages an outer surface of the metallic pipe.

2. The fitting of claim 1, wherein the connection portion includes a frusto-conical internal surface coaxial with the longitudinal axis and surrounding the gripper.

3. The fitting of claim 2, wherein a clearance is provided between the gripper and the internal surface that permits movement of the gripper with respect to the internal surface.

4. The fitting of claim 1, wherein the plurality of prongs are shaped as tabs.

5. The fitting of claim 1, wherein the plurality of prongs are spaced at substantially equal distances from each other in a circumferential direction.

6. The fitting of claim 1, wherein the retainer is movable along the longitudinal axis to urge the gripper towards the opening.

7. The fitting of claim 1, wherein the plurality of gripping projections are spaced from each other in an axial direction.

8. The fitting of claim 1, wherein the plurality of gripping projections are arranged in circumferential rings.

9. The fitting of claim 1, wherein each gripping projection is shaped as a triangular prism.

10. The fitting of claim 1, wherein each gripping projection comprises a slanted side extending from an internal surface of the gripper at an obtuse angle, the slanted side being angled away from the opening.

11. The fitting of claim 10, wherein the internal surface is cylindrical.

12. The fitting of claim 1, further comprising an O-ring to form a seal with the metallic pipe.

13. The fitting of claim 12, wherein the O-ring forms the seal with the outer surface of the metallic pipe.

14. The fitting of claim 1, wherein each of the ribs of the plurality of ribs is shaped as a triangular prism.

\* \* \* \* \*